US011598645B2

(12) United States Patent
Koshiba et al.

(10) Patent No.: US 11,598,645 B2
(45) Date of Patent: Mar. 7, 2023

(54) DRIVING ASSISTANCE SYSTEM, ROUTE GUIDANCE SYSTEM, DRIVING ASSISTANCE METHOD, AND DRIVING ASSISTANCE PROGRAM

(71) Applicants: AISIN CORPORATION, Kariya (JP); TOYOTA JIDOSHA KABUSHIKI KAISHA, Toyota (JP)

(72) Inventors: Sadahiro Koshiba, Takahama (JP); Kazuteru Maekawa, Miyoshi (JP); Seiji Takahata, Nishio (JP); Takahiro Yamaguchi, Kazaki (JP); Shingo Kinashi, Okazaki (JP); Yuji Sato, Owariasahi (JP); Hironobu Sugimoto, Nagoya (JP); Xin Jin, Nagoya (JP); Hiroaki Sakakibara, Setagaya-ku (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 16/632,146

(22) PCT Filed: May 28, 2018

(86) PCT No.: PCT/JP2018/020327
§ 371 (c)(1),
(2) Date: Jan. 17, 2020

(87) PCT Pub. No.: WO2019/039019
PCT Pub. Date: Feb. 28, 2019

(65) Prior Publication Data
US 2020/0232810 A1 Jul. 23, 2020

(30) Foreign Application Priority Data
Aug. 22, 2017 (JP) .............................. JP2017-159237

(51) Int. Cl.
*G01C 21/36* (2006.01)
*G01C 21/00* (2006.01)

(52) U.S. Cl.
CPC ....... *G01C 21/3667* (2013.01); *G01C 21/387* (2020.08)

(58) Field of Classification Search
CPC ............... G01C 21/3667; G01C 21/32; G01C 21/3804; G08G 1/137; G09B 29/00
See application file for complete search history.

(56) References Cited

U.S. PATENT DOCUMENTS

2010/0179752 A1\* 7/2010 Sengoku .......... G08G 1/096811
701/416
2015/0112537 A1\* 4/2015 Kawamata ........... G05D 1/0061
701/23

(Continued)

FOREIGN PATENT DOCUMENTS

| JP | 2016-161456 A | 9/2016 |
| JP | 2017-7572 A | 1/2017 |

(Continued)

OTHER PUBLICATIONS

Aug. 21, 2018 Search Report issued in International Patent Application No. PCT/JP2018/020327.

*Primary Examiner* — Rami Khatib
(74) *Attorney, Agent, or Firm* — Oliff PLC (57) ABSTRACT

Driving assistance systems, methods, and programs accept an inputted planned travel route from the route guidance system, provide driving assistance of the vehicle on the planned travel route, based on driving assistance map data, and obtain, when versions of the route guidance map data and the driving assistance map data do not match each other, the driving assistance map data whose version matches the version of the route guidance map data from a map provider. Route guidance systems search for a planned travel route (Continued)

based on route guidance map data, provide guidance on the planned travel route, output the planned travel route to the driving assistance system, and obtain, when versions of the route guidance map data and the driving assistance map data do not match each other, the route guidance map data whose version matches the version of the driving assistance map data from a map provider.

6 Claims, 3 Drawing Sheets

(56) References Cited

U.S. PATENT DOCUMENTS

| | | | |
|---|---|---|---|
| 2016/0259814 A1 | 9/2016 | Mizoguchi | |
| 2017/0082454 A1* | 3/2017 | Jurk | G01C 21/20 |
| 2019/0322291 A1* | 10/2019 | Tsuda | G05D 1/0088 |
| 2019/0384294 A1* | 12/2019 | Shashua | G05D 1/0088 |
| 2020/0056894 A1* | 2/2020 | Kawabata | G01C 21/367 |

FOREIGN PATENT DOCUMENTS

| | | |
|---|---|---|
| JP | 2017-78775 A | 4/2017 |
| JP | 2017-116373 A | 6/2017 |

\* cited by examiner

DRIVING ASSISTANCE SYSTEM, ROUTE GUIDANCE SYSTEM, DRIVING ASSISTANCE METHOD, AND DRIVING ASSISTANCE PROGRAM

TECHNICAL FIELD

Related technical fields include driving assistance systems, route guidance systems, driving assistance methods, and driving assistance programs.

BACKGROUND

There is known a map data processing device that uses a map database for route guidance and map display and a high-resolution map database for driving assistance control such as self-driving (see JP 2016-161456 A).

When route guidance and driving assistance control are performed by the same device as in JP 2016-161456 A, it is highly likely that two map databases can be, for example, updated at once (e.g., step S9 of FIG. 4). However, when route guidance and driving assistance control are performed by different devices, a case in which two map databases cannot be, for example, updated at once can occur. As a result, route guidance and driving assistance control are performed using two unmatched map databases, causing a problem of the occurrence of a malfunction. For example, when a road section whose route guidance is provided is not defined in a map database used for driving assistance control, it becomes impossible to continue the driving assistance control.

Exemplary embodiments of the broad inventive principles described herein provide a technique enabling a route guidance system and a driving assistance system to use pieces of matched map data.

Exemplary embodiments provide driving assistance systems, methods, and programs that accept, as input, the planned travel route from the route guidance system, provide driving assistance of the vehicle on the planned travel route, based on driving assistance map data, and obtain, when versions of the route guidance map data and the driving assistance map data do not match each other, the driving assistance map data whose version matches the version of the route guidance map data from a map provider.

Exemplary embodiments provide route guidance systems that search for a planned travel route of a vehicle based on route guidance map data, provide guidance on the planned travel route, output the planned travel route to the driving assistance system, and obtain, when versions of the route guidance map data and the driving assistance map data do not match each other, the route guidance map data whose version matches the version of the driving assistance map data from a map provider.

In the above-described configurations, it is configured such that the driving assistance system and the route guidance system can communicate with each other, and individually record driving assistance map data and route guidance map data in their recording media. The route guidance system performs a route search for a planned travel route based on the route guidance map data, and the driving assistance system provides driving assistance of the vehicle on the planned travel route based on the driving assistance map data. The route search and the driving assistance are performed using different pieces of map data, but the versions of the route guidance map data and the driving assistance map data can be allowed to match each other, enabling to implement driving assistance that conforms to a planned travel route whose guidance is being provided.

DETAILED DESCRIPTION OF EXEMPLARY EMBODIMENTS

Here, exemplary embodiments will be described in the following order:

(1) Configuration of a vehicle system;
    (1-1) Configuration of the vehicle;
    (1-2) Configuration of the route guidance system;
    (1-3) Configuration of the driving assistance system;
(2) Processes performed by the vehicle system; and
(3) Another embodiment.

(1) Configuration of a Vehicle System

Figure 1:
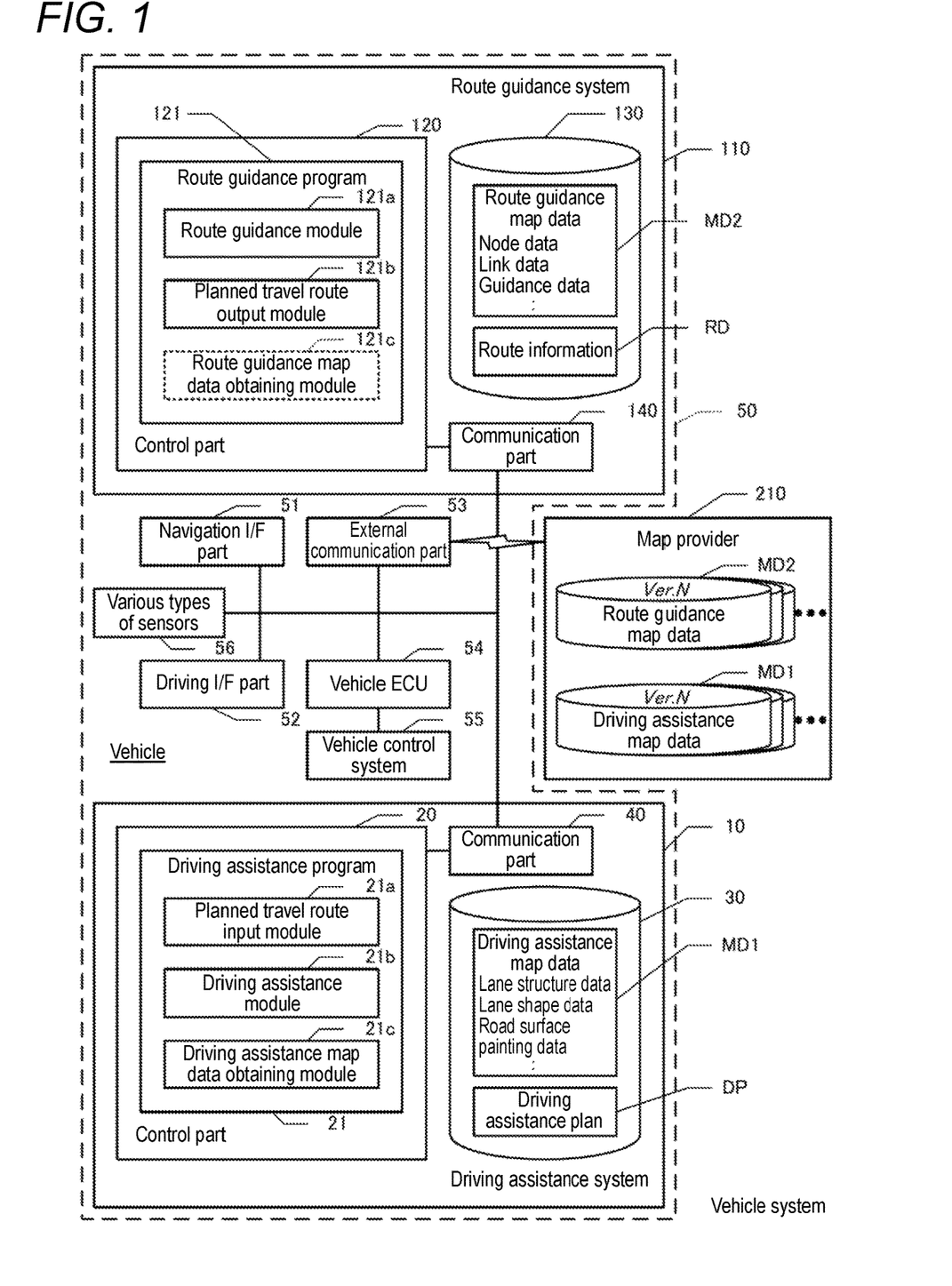
FIG. 1 is a block diagram of a vehicle system.
Figure 2:
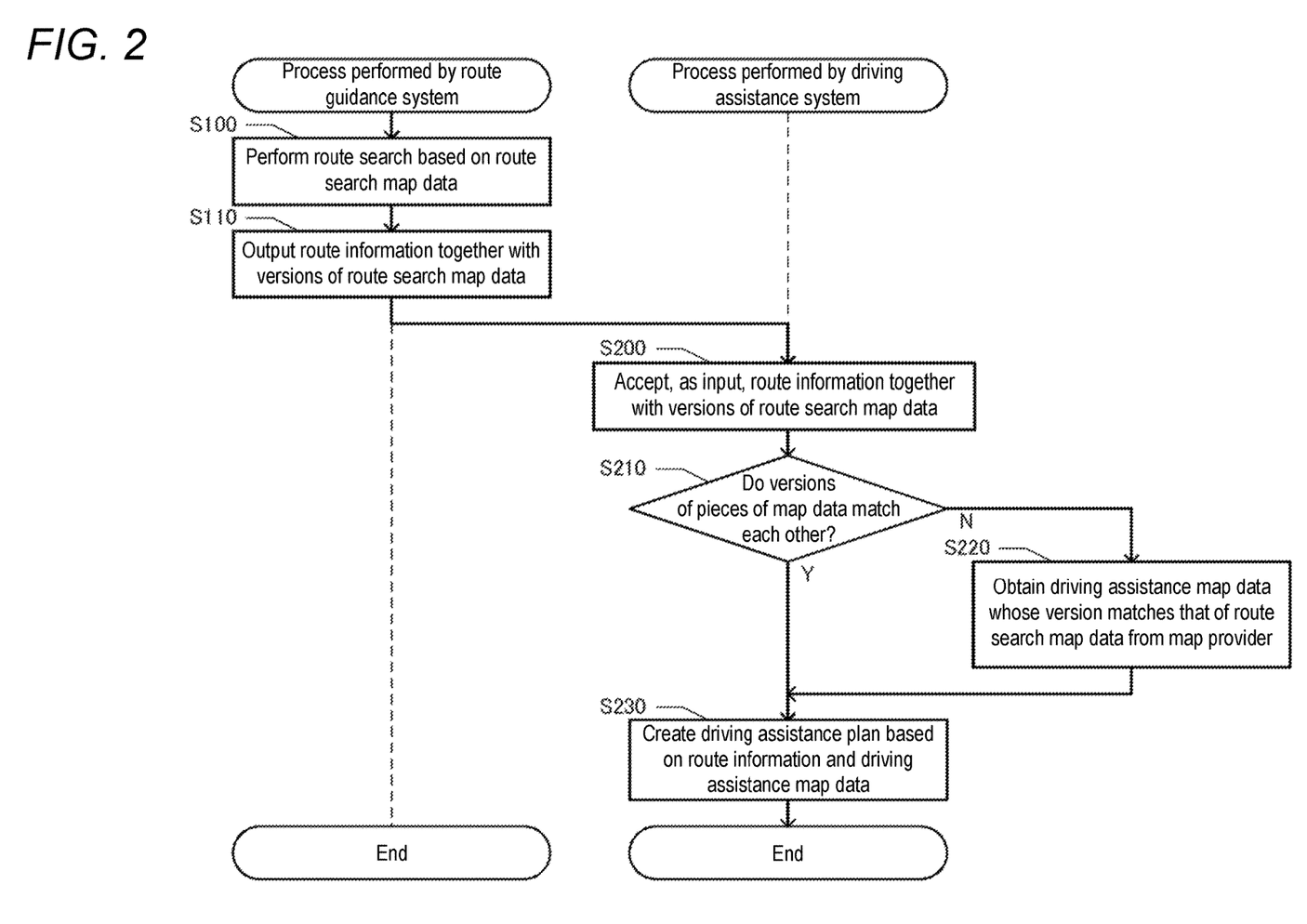
FIG. 2 is a flowchart of processes performed by the vehicle system.

FIG. 1 is a block diagram of a vehicle system. The vehicle system includes a vehicle 50 and a map provider 210. A driving assistance system 10 and a route guidance system 110 are mounted on the vehicle 50. The vehicle 50 includes a navigation I/F part 51, a driving I/F part 52, an external communication part 53, a vehicle electronic control unit (ECU) 54, a vehicle control system 55, and various types of sensors 56. The navigation I/F part 51 is a user interface for providing route guidance, and includes a touch panel display, various types of switches, a speaker, etc. The driving I/F part 52 is a device that performs operations related to driving (including self-driving) and outputs information about driving, and includes various types of operating parts such as a steering wheel, pedals, and a lever, and an output part for various types of information.

The external communication part 53 is a communication circuit for performing wireless communication with the map provider 210. The map provider 210 is a server that records driving assistance map data MD1 and route guidance map data MD2. The map provider 210 records therein the driving assistance map data MD1 and the route guidance map data MD2. Details of the driving assistance map data MD1 and the route guidance map data MD2 will be described later. The map provider 210 manages the driving assistance map data MD1 and the route guidance map data MD2 using common version numbers. For example, when route guidance map data MD2 whose version number is N is generated, driving assistance map data MD1 that matches the route guidance map data MD2 is also generated at the same timing, and the driving assistance map data MD1 is also given N (N is a natural number) as its version number. The map provider 210 records therein not only the driving assistance map data MD1 and the route guidance map data MD2 whose version numbers are N, but also pieces of driving assistance map data MD1 and pieces of route guidance map data MD2 whose version numbers are N−1, N−2, N−3 . . . . Note that a larger version number indicates a newer version. The version number may be any as long as the version number is unique to each version, and the version number is not limited to a natural number and does not need to be incremented by one every time the version is renewed.

When driving assistance map data MD1 and route guidance map data MD2 that have a common version number are updated by the map provider 210, the map provider 210 delivers the driving assistance map data MD1 and the route guidance map data MD2 that have the common version number to the driving assistance system 10 and the route guidance system 110. Hence, the driving assistance system 10 and the route guidance system 110 in the same vehicle 50 record, in principle, driving assistance map data MD1 and route guidance map data MD2 that have a common version number in their recording media 30 and 130. However, in a case, for example, in which delivery of one of driving assistance map data MD1 and route guidance map data MD2 has been normally completed, but communication has been cut off while the other is delivered, the driving assistance map data MD1 and the route guidance map data MD2 which are used by the driving assistance system 10 and the route guidance system 110 can vary in their versions.

In addition, driving assistance map data MD1 and route guidance map data MD2 are delivered on a mesh-by-mesh basis, the meshes being obtained by dividing a map into a grid pattern (e.g., grids which are 5 km×5 km on each side), and for example, driving assistance map data MD1 with the latest version and route guidance map data MD2 with the latest version are delivered for meshes belonging to an area in which the vehicle 50 is likely to travel. In the driving assistance map data MD1 and the route guidance map data MD2, the meshes are given common mesh IDs, and the mesh IDs are independent of the versions of the driving assistance map data MD1 and the route guidance map data MD2.

The vehicle ECU 54 is a computer for controlling the vehicle control system 55. Note that during manual driving, the vehicle ECU 54 controls the vehicle control system 55 in response to operations performed on the driving I/F part 52. On the other hand, during self-driving, the vehicle ECU 54 controls the vehicle control system 55 based on instructions from the driving assistance system 10. The vehicle control system 55 includes various types of actuators for accelerating, decelerating, and steering the vehicle 50.

The various types of sensors 56 are sensors for detecting the location of the vehicle 50, etc., and are a GPS receiving part, a vehicle speed sensor, a gyro sensor, external cameras, etc. The current location of the vehicle 50 can be identified based on output signals from the GPS receiving part, the vehicle speed sensor, and the gyro sensor. The route guidance system 110 provides route guidance based on the current location of the vehicle 50. In addition, by performing an image recognition process on front and rear views of the vehicle 50 which are captured by the external cameras, a high-accuracy recognition location of the vehicle 50 can be obtained, and the route guidance system 110 performs self-driving based on the high-accuracy recognition location.

(1-2) Configuration of the Route Guidance System:

The route guidance system 110 searches for a planned travel route of the vehicle 50 based on route guidance map data MD2, and provides guidance on the planned travel route. To do so, the route guidance system 110 includes a control part 120, the recording medium 130, and a communication part 140. The control part 120 includes a CPU, a RAM, a ROM, etc., and executes a route guidance program 121 stored in the recording medium 130 or the ROM. As used herein, the term "recording medium" does not encompass transitory signals. The communication part 140 is a wired communication circuit for enabling the route guidance system 110 to communicate with the various parts 51 to 56 of the vehicle 50 and the driving assistance system 10. As a matter of course, the communication part 140 may be a wireless communication circuit.

The recording medium 130 records therein route guidance map data MD2 and route information RD. The route guidance map data MD2 includes node data, link data, and guidance data. Each node data mainly represents information about an intersection. Specifically, node data represents the coordinates of a node corresponding to an intersection, and the shape of the intersection. Each link data represents, for a link corresponding to a road section, various types of information such as a link ID, section length, travel time, and a speed limit. The road sections are units of a road that continues in a length direction and is divided at intersections. Nodes are present at both ends of a link. Note that a node to which three or more links are connected corresponds to an intersection.

The link ID is given so as to be unique to each link. Note that even if road sections are identical in reality, the road sections may have different link IDs if their corresponding pieces of route guidance map data MD2 have different versions. The section length is the length of a road section. The link data includes shape interpolation point data. The shape interpolation point data is data representing the coordinates of a shape interpolation point which is set at the center in a width direction of a road section. The guidance data is data that stores audio, images, etc., used for route guidance.

The route information RD is information indicating a planned travel route. The planned travel route includes a series of road sections that continuously connect a point of departure to a destination. The route information RD is information indicating the link IDs of the series of road sections included in the planned travel route, etc.

The route guidance program 121 includes a route guidance module 121a and a planned travel route output module 121b. The route guidance module 121a and the planned travel route output module 121b are program modules that cause the control part 120 which is a computer to function as a route guidance part and a planned travel route output part, respectively.

By a function of the route guidance module 121a, the control part 120 searches for a planned travel route of the vehicle based on the route guidance map data MD2, and provides guidance on the planned travel route. First, by the function of the route guidance module 121a, the control part 120 obtains a point of departure and a destination based on operations performed on the navigation I/F part 51, and searches for a planned travel route that connects the point of departure to the destination. The control part 120 calculates a search cost on a per road section basis, and searches for a planned travel route with the smallest total value of the search costs. For example, the control part 120 may perform a route search by a publicly known technique such as Dijkstra's algorithm. Note that the point of departure may be the current location of the vehicle 50. The control part 120 allows the navigation I/F part 51 to output a screen and audio for providing guidance on the planned travel route.

By a function of the planned travel route output module 121b, the control part 120 outputs the planned travel route to the driving assistance system. Namely, the control part 120 transmits route information RD indicating the link IDs of a series of road sections included in the planned travel route, etc., to the driving assistance system 10. In addition, by the function of the planned travel route output module 121b, the control part 120 transmits version information together with the route information RD to the driving assistance system 10, the version information indicating, for each mesh (mesh ID) through which the planned travel route passes, the version of the route guidance map data MD2. The mesh through which the planned travel route passes is a mesh in which there is at least one road section included in the planned travel route.

(1-3) Configuration of the Driving Assistance System:

The driving assistance system 10 creates a driving assistance plan DP for allowing the vehicle 50 to travel on a planned travel route, based on driving assistance map data MD1. To do so, the driving assistance system 10 includes a control part 20, the recording medium 30, and a communication part 40. The communication part 40 is a wired communication circuit for enabling the driving assistance system 10 to communicate with the various parts 51 to 56 of the vehicle 50 and the route guidance system 110. As a matter of course, the communication part 40 may be a wireless communication circuit. The control part 20 includes a CPU, a RAM, a ROM, etc., and executes a driving assistance program 21 stored in the recording medium 30 or the ROM.

The recording medium 30 records therein driving assistance map data MD1 and a driving assistance plan DP. The driving assistance map data MD1 is map data that more specifically defines each road section, the shape of each intersection, etc., than route guidance map data MD2. Specifically, the driving assistance map data MD1 includes lane structure data, lane shape data, road surface painting data, etc. The lane structure data is data that defines, for each road section, the number of lanes, the construction status of an additional lane near an intersection, etc. The lane shape data is data that defines the width of a lane, the length of the lane, etc. The road surface painting data is data representing the location and meaning of painting applied to a road surface. Note that when the versions of driving assistance map data MD1 and route guidance map data MD2 match each other, common link IDs are used in the driving assistance map data MD1 and the route guidance map data MD2. The driving assistance plan DP indicates time-series target locations set on a planned travel route, and a target vehicle speed, a target acceleration rate, and a target steering angle for each target location. Note, however, that common link IDs do not necessarily need to be used in driving assistance map data MD1 and route guidance map data MD2 whose versions match each other. In this case, index information may be prepared that indicates the correspondence between link IDs provided to road sections which are common between the driving assistance map data MD1 and the route guidance map data MD2.

The driving assistance program 21 includes a planned travel route input module 21a, a driving assistance module 21b, and a driving assistance map data obtaining module 21c. The planned travel route input module 21a, the driving assistance module 21b, and the driving assistance map data obtaining module 21c are program modules that cause the control part 120 which is a computer to function as a planned travel route input part, a driving assistance part, and a driving assistance map data obtaining part, respectively.

By a function of the planned travel route input module 21a, the control part 20 accepts, as input, a planned travel route from the route guidance system 110. Specifically, by the function of the planned travel route input module 21a, the control part 20 accepts, as input, route information RD indicating the link IDs of a series of road sections included in a planned travel route, etc., from the route guidance system 110. At this time, the control part 20 accepts, as input, version information indicating, for each mesh through which the planned travel route passes, the version of route guidance map data MD2 from the route guidance system 110.

By a function of the driving assistance module 21b, the control part 20 provides driving assistance that allows the vehicle 50 to travel on the planned travel route, based on driving assistance map data MD1. By the function of the driving assistance module 21b, the control part 20 obtains lane structure data and lane shape data corresponding to the link IDs of the road sections indicated by the route information RD, and sets time-series target locations to which the vehicle 50 travels on the road sections, based on the lane structure data and the lane shape data. In addition, the control part 20 sets a target vehicle speed, a target acceleration rate, and a target steering angle for each target location. The control part 20 creates a driving assistance plan DP indicating the time-series target locations and the target vehicle speed, target acceleration rate, and target steering angle for each target location.

By the function of the driving assistance module 21b, the control part 20 performs feedback control of the vehicle control system 55 so that the target vehicle speed, target acceleration rate, and target steering angle for each target location which are indicated by the driving assistance plan DP can be implemented. Specifically, the control part 20 obtains a high-accuracy recognition location of the vehicle 50 by performing an image recognition process on front and rear views of the vehicle 50 which are captured by the external cameras included in the various types of sensors 56, and performs feedback control of the vehicle control system 55 such that the high-accuracy recognition location approaches a target location indicated by the driving assistance plan DP. Likewise, the control part 20 performs feedback control of the vehicle control system 55 such that the actual acceleration rate and steering angle approach a target acceleration rate and a target steering angle which are indicated by the driving assistance plan DP. The control part 20 implements self-driving by outputting control data representing the amount of feedback control performed by the vehicle control system 55 to the vehicle ECU 54.

By a function of the driving assistance map data obtaining module 21c, when the versions of route guidance map data MD2 and driving assistance map data MD1 do not match each other, the control part 20 obtains driving assistance map data MD1 whose version matches that of the route guidance map data MD2 from the map provider 210. By the function of the driving assistance map data obtaining module 21c, the control part 20 obtains meshes through which the planned travel route indicated by the route information RD which is inputted from the route guidance system 110 passes, and obtains, for each mesh, the version of driving assistance map data MD1 recorded in the recording medium 30. Furthermore, the control part 20 obtains, for each mesh through which the planned travel route passes, the version of route guidance map data MD2, based on the version information of the route guidance map data MD2 inputted from the route guidance system 110. Then, the control part 20 determines, for each mesh through which the planned travel route passes, whether the version of the driving assistance map data MD1 matches the version of the route guidance map data MD2. Here, the expression "the versions match each other" indicates that the version numbers match each other.

By the function of the driving assistance map data obtaining module 21c, when the versions of the route guidance map data MD2 and the driving assistance map data MD1 do not match each other, the control part 20 obtains driving assistance map data MD1 for the meshes through which the planned travel route passes, from the map provider 210. The control part 20 obtains, for a mesh whose corresponding pieces of map data have unmatched versions among the meshes through which the planned travel route passes, driving assistance map data MD1 whose version matches that of route guidance map data MD2 from the map provider 210. As a result, only data for the meshes through which the planned travel route passes out of driving assistance map data MD1 whose version matches that of route guidance map data MD2 (in the map provider 210, data is prepared for all meshes) is obtained from the map provider 210.

Furthermore, by the function of the driving assistance map data obtaining module 21c, when the versions of the route guidance map data MD2 and the driving assistance map data MD1 match each other, the control part 20 does not obtain driving assistance map data MD1 from the map provider 210. The control part 20 does not obtain driving assistance map data MD1 for a mesh whose corresponding pieces of map data have matched versions among the meshes through which the planned travel route passes, from the map provider 210. As a matter of course, when versions match each other for all meshes through which the planned travel route passes, the control part 20 does not obtain driving assistance map data MD1 for any of the meshes from the map provider 210.

In the present embodiment described above, driving assistance and a route search are performed using difference pieces of map data, but the versions of route guidance map data MD2 and driving assistance map data MD1 can be allowed to match each other, enabling to implement driving assistance that conforms to a planned travel route whose guidance is being provided. Specifically, driving assistance map data MD1 representing the structure of a lane formed in a road section can be allowed to match route guidance map data MD2 representing the road section itself.

When the versions of pieces of map data do not match each other, data for meshes through which a planned travel route passes is obtained from the map provider 210, by which for the meshes through which the planned travel route passes, the versions of route guidance map data MD2 and driving assistance map data MD1 can be allowed to match each other. Furthermore, the amount of driving assistance map data MD1 to be obtained from the map provider 210 can be reduced. Note that when pieces of map data match each other in the first place, driving assistance map data MD1 which is already obtained is used as it is. By this, the amount of driving assistance map data MD1 to be obtained from the map provider 210 can be reduced.

(2) Processes Performed by the Vehicle System

Figure 3:
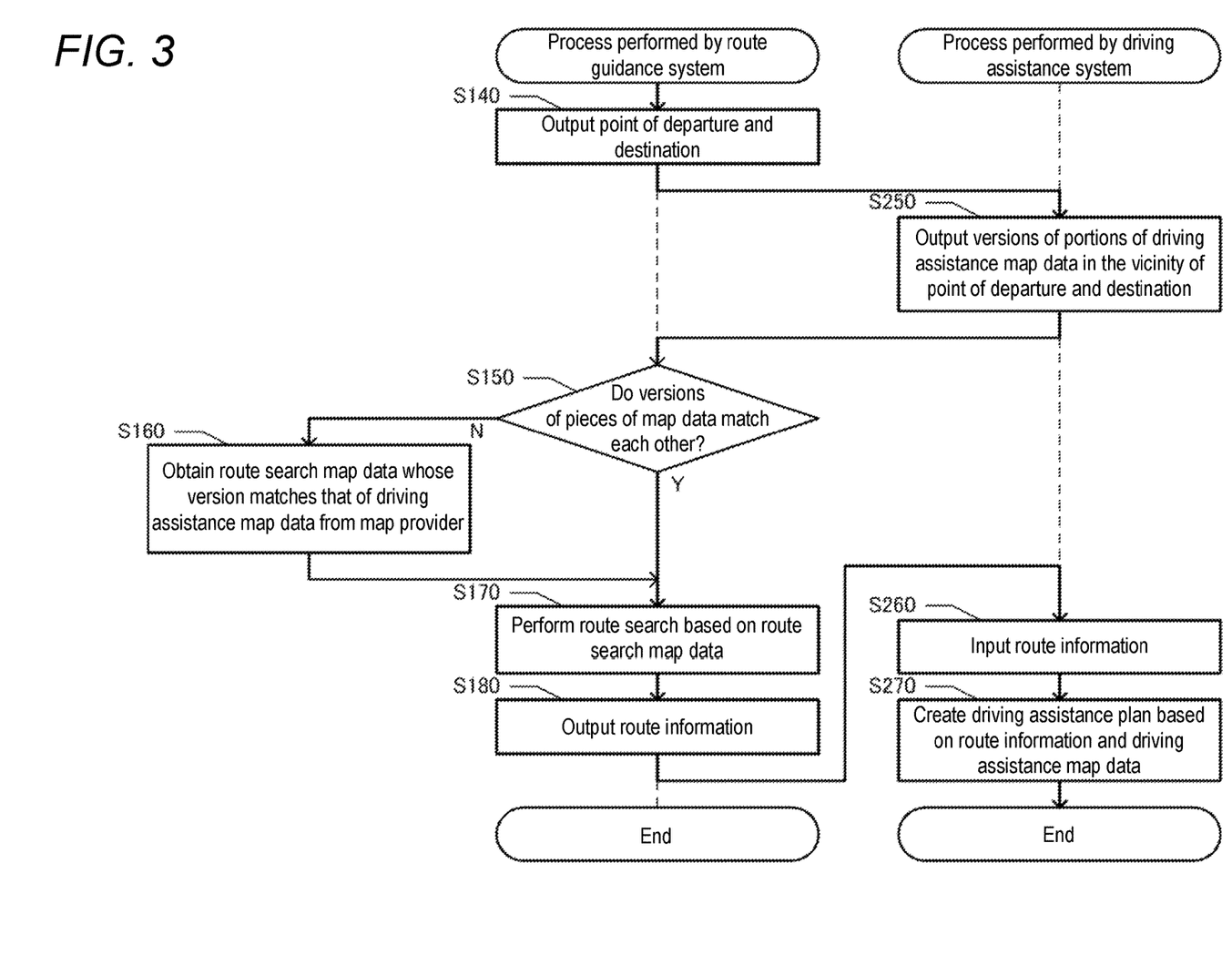
FIG. 3 is a flowchart of processes performed by a vehicle system according to another embodiment.

Next, processes performed by the driving assistance system 10 and the route guidance system 110 will be described. FIG. 3 is a flowchart of processes performed by the driving assistance system 10 and the route guidance system 110. The processes are performed when the route guidance system 110 searches for a planned travel route.

First, by the function of the route guidance module 121a, the control part 120 of the route guidance system 110 performs a route search based on route guidance map data MD2 (step S100). Namely, the control part 120 searches for a planned travel route including a series of road sections that connect a point of departure to a destination and that are defined in the route guidance map data MD2, by a publicly known technique.

Then, by the function of the planned travel route output module 121b, the control part 120 of the route guidance system 110 outputs route information RD together with the versions of the route guidance map data MD2 (step S110). Namely, the control part 120 transmits route information RD indicating the series of road sections included in the planned travel route, etc., to the driving assistance system 10. Furthermore, the control part 20 transmits version information indicating, for each mesh (mesh ID) through which the planned travel route passes, the version of the route guidance map data MD2 to the driving assistance system 10.

Then, by the function of the planned travel route input module 21a, the control part 20 of the driving assistance system 10 accepts, as input, the route information RD together with the versions of the route guidance map data MD2 (step S200). Namely, the control part 20 receives the route information RD and the version information indicating, for each mesh (mesh ID) through which the planned travel route indicated by the route information RD passes, the version of the route guidance map data MD2 from the route guidance system 110.

Then, by the function of the driving assistance map data obtaining module 21c, the control part 20 of the driving assistance system 10 determines whether the versions of pieces of map data match each other (step S210). Namely, the control part 20 determines, for each mesh through which the road sections on the planned travel route pass, whether the versions of driving assistance map data MD1 and the route guidance map data MD2 match each other.

If it is not determined that the versions of pieces of map data match each other (step S210: N), by the function of the driving assistance map data obtaining module 21c, the control part 20 of the driving assistance system 10 obtains driving assistance map data MD1 whose version matches that of the route guidance map data MD2 from the map provider 210 (step S220). Here, the case in which it is not determined that the versions of pieces of map data match each other indicates a case in which the versions of the driving assistance map data MD1 and the route guidance map data MD2 do not match each other for at least one mesh through which the planned travel route passes. The control part 20 obtains, for only a mesh whose corresponding driving assistance map data MD1 and route guidance map data MD2 have unmatched versions, driving assistance map data MD1 whose version matches that of the route guidance map data MD2 from the map provider 210.

On the other hand, if it is determined that the versions of pieces of map data match each other (step S210: Y), the control part 20 of the driving assistance system 10 skips step S220. Namely, when the versions of the driving assistance map data MD1 and the route guidance map data MD2 match each other for all meshes through which the planned travel route passes, driving assistance map data MD1 is not obtained from the map provider 210.

Finally, by the function of the driving assistance module 21b, the control part 20 of the driving assistance system 10 creates a driving assistance plan DP, based on the route information RD and the driving assistance map data MD1 (step S230). As a result, the control part 20 provides driving assistance that allows the vehicle 50 to travel on the planned travel route, based on the driving assistance plan DP.

(3) Another Embodiment

As indicated by a dotted line in FIG. 1, the control part 120 of the route guidance system 110 may execute a route guidance map data obtaining module 121c. Namely, the route guidance system 110 may include a route guidance map data obtaining part that obtains, when the versions of route guidance map data MD2 and driving assistance map data MD1 do not match each other, route guidance map data MD2 whose version matches that of the driving assistance map data MD1 from the map provider 210. That is, the configuration may be such that when the versions of route guidance map data MD2 and driving assistance map data MD1 do not match each other, instead of the driving assistance system 10, the route guidance system 110 obtains map data from the map provider 210. In this case, the control part 20 of the driving assistance system 10 does not need to execute the driving assistance map data obtaining module 21*c*.

FIG. 3 is a flowchart of processes performed by a vehicle system of the present embodiment. First, by the function of the planned travel route output module 121*b*, the control part 120 of the route guidance system 110 outputs a point of departure and a destination (step S140). Namely, at a stage at which a point of departure and a destination of a planned travel route have been set, the control part 120 transmits information indicating the point of departure and the destination to the driving assistance system 10.

Then, the control part 20 of the driving assistance system 10 outputs the versions of portions of driving assistance map data MD1 around the point of departure and the destination (step S250). Namely, the control part 20 sets a rectangular surrounding region including the point of departure and the destination, and sends, as a response, the versions of portions of the driving assistance map data MD1 corresponding to meshes that belong to the surrounding region, to the route guidance system 110. Specifically, the control part 20 transmits version information in which the mesh IDs of the meshes belonging to the surrounding region are associated with the versions of the meshes, to the route guidance system 110. The surrounding region may be, for example, a rectangular region whose vertex angles on the same diagonal line are formed by a mesh including the point of departure and a mesh including the destination, or a region enclosed by straight lines obtained by shifting each side of the rectangular region outward by a certain distance (corresponding to several meshes).

Then, by a function of the route guidance map data obtaining module 121*c*, the control part 120 of the route guidance system 110 determines whether the versions of pieces of map data match each other (step S150). Namely, the control part 20 determines, for each mesh belonging to the surrounding region including the point of departure and the destination, whether the versions of route guidance map data MD2 and the driving assistance map data MD1 match each other.

If it is not determined that the versions of pieces of map data match each other (step S150: N), by the function of the route guidance map data obtaining module 121*c*, the control part 120 of the route guidance system 110 obtains route guidance map data MD2 whose version matches that of the driving assistance map data MD1 from the map provider 210 (step S160). Here, the case in which it is not determined that the versions of pieces of map data match each other indicates a case in which the versions of the driving assistance map data MD1 and the route guidance map data MD2 do not match each other for at least one mesh belonging to the surrounding region including the point of departure and the destination. The control part 120 obtains, for only a mesh whose corresponding driving assistance map data MD1 and route guidance map data MD2 have unmatched versions, route guidance map data MD2 whose version matches that of the driving assistance map data MD1 from the map provider 210.

On the other hand, if it is determined that the versions of pieces of map data match each other (step S150: Y), the control part 120 of the route guidance system 110 skips step S160. Namely, when the versions of the driving assistance map data MD1 and the route guidance map data MD2 match each other for all meshes belonging to the surrounding region including the point of departure and the destination, route guidance map data MD2 is not obtained from the map provider 210.

Then, by the function of the route guidance module 121*a*, the control part 120 of the route guidance system 110 performs a route search based on the route guidance map data MD2 (step S170). Specifically, the control part 20 searches for a planned travel route that includes road sections in the meshes belonging to the surrounding region whose corresponding route guidance map data MD2 and driving assistance map data MD1 have matched versions. Then, by the function of the planned travel route output module 121*b*, the control part 120 of the route guidance system 110 outputs route information RD (step S180). Namely, the control part 120 transmits route information RD indicating the link IDs of the series of road sections included in the planned travel route, etc., to the driving assistance system 10.

By doing so, by the function of the planned travel route input module 21*a*, the control part 20 of the driving assistance system 10 accepts, as input, the route information RD (step S260). Namely, the control part 20 accepts, as input, the route information RD indicating the link IDs of the series of road sections included in the planned travel route, etc., from the route guidance system 110.

Finally, by the function of the driving assistance module 21*b*, the control part 20 of the driving assistance system 10 creates a driving assistance plan DP, based on the route information RD and the driving assistance map data MD1 (step S270). As a result, the control part 20 provides driving assistance that allows the vehicle 50 to travel on the planned travel route, based on the driving assistance plan DP.

As described above, by the route guidance system 110 obtaining route guidance map data MD2 whose version matches that of driving assistance map data MD1, too, the pieces of map data can be allowed to match each other, enabling to implement driving assistance that conforms to a planned travel route whose guidance is being provided.

Furthermore, the control part 20 of the driving assistance system 10 may execute the driving assistance map data obtaining module 21*c*, and the control part 120 of the route guidance system 110 may execute the route guidance map data obtaining module 121*c*. Namely, the configuration may be such that both the driving assistance system 10 and the route guidance system 110 can obtain map data.

For example, when the version of route guidance map data MD2 is older than that of driving assistance map data MD1, the route guidance system 110 may obtain route guidance map data MD2 from the map provider 210. Conversely, when the version of driving assistance map data MD1 is older than that of route guidance map data MD2, the driving assistance system 10 may obtain driving assistance map data MD1 from the map provider 210. Furthermore, either one of driving assistance map data MD1 and route guidance map data MD2 whose amount of map data that needs to be obtained for version matching is smaller may be obtained by the driving assistance system 10 or the route guidance system 110 from the map provider 210.

As long as the driving assistance system and the route guidance system can communicate with each other, communication means therebetween may be wired communication or wireless communication. In addition, the route guidance system may be implemented by a plurality of communicable devices, and a server may perform a route search and a device mounted on the vehicle may provide route guidance. The planned travel route input part accepts, as input, a planned travel route from the route guidance system by communication. The planned travel route is a route on which a vehicle which is a driving assistance target plans to travel. The planned travel route is a route connecting a point of departure to a destination, and may be identified by, for example, a series of road sections (links) connecting a point of departure to a destination.

The case in which the versions of route guidance map data and driving assistance map data do not match each other may be a case in which the version of the route guidance map data is newer than that of the driving assistance map data, or a case in which the version of the route guidance map data is older than that of the driving assistance map data. By recording various versions of driving assistance map data in the map provider, driving assistance map data whose version matches that of route guidance map data can be provided. Note that map data may be partially updated, and the versions of map data for all areas are not always identical. Hence, a determination as to whether the versions of pieces of map data match each other may be made exclusively for an area that has been actually used to search for a planned travel route or an area that is highly likely to be actually used to search for a planned travel route.

As long as the driving assistance is driving assistance other than route guidance, the driving assistance may be performance of self-driving or may be driving assistance other than self-driving (e.g., calling for attention). The self-driving may be assistance in acceleration or deceleration or may be assistance in steering. In general, driving assistance map data for providing driving assistance more specifically identifies the shapes, structures, etc., of roads on which the vehicle travels than route guidance map data for providing route guidance.

When the versions of route guidance map data and driving assistance map data do not match each other, the driving assistance map data obtaining part may obtain driving assistance map data for meshes through which a planned travel route passes, from the map provider. By this, for the meshes through which the planned travel route passes, the versions of route guidance map data and driving assistance map data can be allowed to match each other. Furthermore, the amount of driving assistance map data to be obtained from the map provider can be reduced. The meshes through which the planned travel route passes are not limited to those that are identified as meshes through which the planned travel route actually passes, and may be meshes through which the planned travel route is highly likely to pass. For example, a polygonal or circular region including a point of departure and a destination may be created, and meshes in the region may be determined to be meshes through which the planned travel route is highly likely to pass. Then, it may be determined, for all meshes in the region, whether the versions of pieces of map information match each other.

Furthermore, when the versions of route guidance map data and driving assistance map data match each other, the driving assistance map data obtaining part may not obtain driving assistance map data from the map provider. Namely, when pieces of map data match each other in the first place, driving assistance map data which is already obtained is used as it is. By this, the amount of driving assistance map data to be obtained from the map provider can be reduced.

In addition, route guidance map data may be map data representing a road section and an intersection to which a plurality of road sections are connected, and driving assistance map data may be map data representing the structure of a lane formed in the road section. By this, driving assistance map data representing the structure of a lane formed in a road section and route guidance map data representing the road section itself can be allowed to match each other.

In addition, the route guidance system may include a route guidance map data obtaining part that obtains, when the versions of route guidance map data and driving assistance map data do not match each other, route guidance map data whose version matches that of the driving assistance map data from the map provider. As such, by the route guidance system obtaining route guidance map data whose version matches that of driving assistance map data, too, the pieces of map data can be allowed to match each other, enabling to implement driving assistance that conforms to a planned travel route whose guidance is being provided. Note that when the version of route guidance map data is older than that of driving assistance map data, the route guidance system may obtain route guidance map data from the map provider. Conversely, when the version of driving assistance map data is older than that of route guidance map data, the driving assistance system may obtain driving assistance map data from the map provider.

Furthermore, the above techniques for allowing the versions of route guidance map data and driving assistance map data to match each other can also be applied as a program or a method. In addition, a system, a program, and a method such as those described above may be implemented as a single device, or may be implemented by using a component shared with various parts included in the vehicle, and include various modes. It is possible to provide, for example, a navigation system or a driving assistance system that includes a device such as that described above, a method, or a program. In addition, changes can be made as appropriate, e.g., a part is software and a part is hardware. Furthermore, implementation is also feasible as a recording medium for a program that controls the device. As a matter of course, the recording medium for software may be a magnetic recording medium or a magneto-optical recording medium, or even any recording medium to be developed in the future can also be considered exactly in the same manner.

The invention claimed is:

1. A driving assistance system capable of communicating with a route guidance system that searches for a planned travel route of a vehicle based on route guidance map data and provides guidance on the planned travel route, the driving assistance system comprising:
   a processor programmed to:
      accept as input:
         the planned travel route from the route guidance system; and
         version information indicating, for each mesh through which the planned travel route indicated by the route information passes, the version of the route guidance map data;
      provide driving assistance of the vehicle on the planned travel route, based on driving assistance map data the driving assistance map data being a different type of map data from the route guidance map data; and
      for each mesh through which the planned travel route indicated by the route information passes:
         compare the version information of the route guidance map data for the mesh with version information for a corresponding mesh in the driving assistance map data; and obtain, when the version information of the route guidance map data for the mesh does not match the version information for the corresponding mesh in the driving assistance map data, driving assistance map data having a version that matches the version information of the route guidance map data for the mesh.

2. The driving assistance system according to claim 1, wherein the processor is programmed to:

when the version information of the route guidance map data for the mesh matches the version information for the corresponding mesh in the driving assistance map data, driving assistance map data having a version that matches the version information of the route guidance map data for the mesh.

3. The driving assistance system according to claim 1, wherein:

the route guidance map data is map data representing a road section and an intersection to which a plurality of the road sections are connected; and the driving assistance map data is map data representing a structure of a lane formed in the road section.

4. A route guidance system capable of communicating with a driving assistance system that creates a driving assistance plan for allowing a vehicle to travel on a planned travel route based on driving assistance map data, the route guidance system comprising:

a processor programmed to:

search for a planned travel route of a vehicle based on route guidance map data, the route guidance map data being a different type of map data from the driving assistance map data;

provide guidance on the planned travel route;

output the planned travel route to the driving assistance system; and accept version information indicating, for each mesh through which the planned travel route passes, the version of the driving assistance map data;

for each mesh through which the planned travel route passes:

compare the version information of the driving assistance map data for the mesh with version information for a corresponding mesh in the route guidance map data; and obtain, when the version information of the route guidance map data for the mesh does not match the version information for the corresponding mesh in the route guidance map data, route guidance map data having a version that matches the version information of the driving assistance map data for the mesh.

5. A driving assistance method performed by a driving assistance system capable of communicating with a route guidance system that searches for a planned travel route of a vehicle based on route guidance map data and provides guidance on the planned travel route, the driving assistance method comprising:

accepting as input:

the planned travel route from the route guidance system; and version information indicating, for each mesh through which the planned travel route indicated by the route information passes, the version of the route guidance map data;

providing driving assistance of the vehicle on the planned travel route, based on driving assistance map data the driving assistance map data being a different type of map data from the route guidance map data; and for each mesh through which the planned travel route indicated by the route information passes:

comparing the version information of the route guidance map data for the mesh with version information for a corresponding mesh in the driving assistance map data; and obtaining, when the version information of the route guidance map data for the mesh does not match the version information for the corresponding mesh in the driving assistance map data, driving assistance map data having a version that matches the version information of the route guidance map data for the mesh.

6. A computer-readable recording medium storing a driving assistance program causing a computer to function as a driving assistance system capable of communicating with a route guidance system that searches for a planned travel route of a vehicle based on route guidance map data and provides guidance on the planned travel route, the driving assistance program causing the computer to perform functions comprising:

accepting as input:

the planned travel route from the route guidance system; and version information indicating, for each mesh through which the planned travel route indicated by the route information passes, the version of the route guidance map data;

providing driving assistance of the vehicle on the planned travel route, based on driving assistance map data the driving assistance map data being a different type of map data from the route guidance map data; and for each mesh through which the planned travel route indicated by the route information passes:

comparing the version information of the route guidance map data for the mesh with version information for a corresponding mesh in the driving assistance map data; and obtaining, when the version information of the route guidance map data for the mesh does not match the version information for the corresponding mesh in the driving assistance map data, driving assistance map data having a version that matches the version information of the route guidance map data for the mesh.

* * * * *